United States Patent [19]
Barsic

[11] Patent Number: 6,135,225
[45] Date of Patent: Oct. 24, 2000

[54] TILT MECHANISM FOR SUPPORTING A CAB ASSEMBLY OF A WORK MACHINE AND AN ASSOCIATED METHOD OF OPERATING A TILT MECHANISM OF A WORK MACHINE

[75] Inventor: Charles E. Barsic, Maple Park, Ill.

[73] Assignee: Caterpillar Inc., Peoria, Ill.

[21] Appl. No.: 09/347,599

[22] Filed: Jun. 30, 1999

[51] Int. Cl.[7] .................................................. B62D 33/06
[52] U.S. Cl. .................................. 180/89.14; 180/89.15; 280/6.154
[58] Field of Search ...................... 280/6.154; 180/89.14, 180/89.15, 41

[56] References Cited

U.S. PATENT DOCUMENTS

| | | | |
|---|---|---|---|
| 4,326,571 | 4/1982 | Crawford | 144/34 E |
| 4,459,061 | 7/1984 | Klement | 403/163 |
| 4,565,486 | 1/1986 | Crawford et al. | 414/729 |
| 4,583,908 | 4/1986 | Crawford | 414/694 |
| 4,597,499 | 7/1986 | Hanula | 213/50.5 |
| 4,991,673 | 2/1991 | Ericsson | 280/6.154 |
| 5,337,847 | 8/1994 | Woods et al. | 180/9.52 |

FOREIGN PATENT DOCUMENTS

| | | | |
|---|---|---|---|
| 1170549 | 7/1984 | Canada | A01G 23/08 |
| 1191429 | 8/1985 | Canada | A01G 23/08 |
| 1201644 | 3/1986 | Canada | A01G 23/08 |

*Primary Examiner*—Kenneth R. Rice
*Attorney, Agent, or Firm*—Maginot, Addison & Moore

[57] ABSTRACT

A tilt mechanism for supporting a cab assembly of a work machine is described. The tilt mechanism includes a frame. The tilt mechanism also includes a support member for supporting the cab assembly. The support member is mechanically coupled to the frame so that the support member is movable relative to the frame. The tilt mechanism further includes an actuation mechanism mechanically coupled to the frame and the support member. The actuation mechanism is operable between a retract mode of operation and an extend mode of operation. Placing the actuation mechanism in the extend mode of operation causes the support member to move relative to the frame such that the support member advances a distance $D_1$ along an axis of the frame in a first direction. Placing the actuation mechanism in the retract mode of operation causes the support member to move relative to the frame such that the support member advances a distance $D_2$ along the axis of the frame in a second direction. An associated method of operating a tilt mechanism of a work machine is also disclosed.

20 Claims, 5 Drawing Sheets

TILT MECHANISM FOR SUPPORTING A CAB ASSEMBLY OF A WORK MACHINE AND AN ASSOCIATED METHOD OF OPERATING A TILT MECHANISM OF A WORK MACHINE

TECHNICAL FIELD OF THE INVENTION

The present invention relates generally to work machines, and more particularly to work machines having a tilt mechanism for supporting a cab assembly thereof.

BACKGROUND OF THE INVENTION

Work machines, such as track type swing machines, have achieved wide acceptance in the construction and forest industries. Such work machines typically have a crawler type track assembly for mobility over uneven terrain, a frame attached to the track assembly, and a work implement supported by the frame. These types of work machines also include an engine, a hydraulic pump system to operate the moving parts of the work machine, and a cab assembly supported by the frame. An operator is typically positioned within the cab assembly to operate the controls of the work machine.

As previously mentioned, track type swing machines are often used off-road on uneven terrain. Therefore, the frame and thus the cab assembly may not be horizontal relative to the horizon when the work machine is located in a position to perform a work function. It is highly desirable, however, for the comfort of the operator and for the most efficient functioning of the work machine that the cab assembly be horizontal while the work machine is performing a work function. Accordingly, it is useful to equip track type swing machines with a tilting mechanism such that the operator can maintain the cab assembly horizontal even when the frame of the work machine is inclined at a significant angle relative to the horizon.

In addition, the tilt mechanism allows the operator to tilt the cab assembly such that the work machine is more capable of maneuvering in close quarters, e.g. maneuvering between rows of trees which are positioned close together.

Heretofore, some tilt mechanisms have utilized pin joints which permit pivotal motion about the pivot axes of the tilt mechanism so as to level the cab assembly. However, a problem with some of these tilt mechanisms is that when the cab assembly is leveled utilizing the aforementioned pivotal motion, the work machine can become relatively unstable and thus more likely to tip over.

What is needed therefore is a tilt mechanism for leveling a cab assembly of a work machine which addresses the above-mentioned drawback.

DISCLOSURE OF THE INVENTION

In accordance with a first embodiment of the present invention, there is provided a tilt mechanism for supporting a cab assembly. The tilt mechanism includes a frame. The tilt mechanism also includes a support member for supporting the cab assembly. The support member is mechanically coupled to the frame so that the support member is movable relative to the frame. The tilt mechanism further includes an actuation mechanism mechanically coupled to the frame and the support member. The actuation mechanism is operable between a retract mode of operation and an extend mode of operation. Placing the actuation mechanism in the extend mode of operation causes the support member to move relative to the frame such that the support member advances a distance $D_1$ along an axis of the frame in a first direction. Placing the actuation mechanism in the retract mode of operation causes the support member to move relative to the frame such that the support member advances a distance $D_2$ along the axis of the frame in a second direction.

In accordance with a second embodiment of the present invention, there is provided a work machine. The work machine includes a frame and a work implement mechanically coupled to the frame. The work machine also includes a support member mechanically coupled to the frame so that the support member is movable relative to the frame between a retract position and an extend position. The work machine further includes a cab assembly supported by the support member. The work machine also includes an actuation mechanism mechanically coupled to the frame and the support member. The actuation mechanism is operable between a retract mode of operation and an extend mode of operation. Placing the actuation mechanism in the extend mode of operation causes the support member to move relative to the frame such that the support member advances a distance $D_1$ along an axis of the frame in a first direction. Placing the actuation mechanism in the retract mode of operation causes the support member to move relative to the frame such that the support member advances a distance $D_2$ along the axis of the frame in a second direction. The support member has a center line $L_1$ which passes through the support member so as to define a substantially 90° angle $\alpha$ between the support member and the center line $L_1$. In addition, a line $L_2$ is defined by a line which is (a) positioned below the frame and (b) in a substantially parallel relationship with a lower edge of the frame. The center line $L_1$ intersects the line $L_2$ at a point $P_1$ when the support member is located in the retract position. The center line $L_1$ also intersects the line $L_2$ at the point $P_1$ when the support member is located in the extend position.

In accordance with a third embodiment of the present invention there is provided a method of operating a tilt mechanism of a work machine having (i) a frame, (ii) a support member mechanically coupled to the frame so that the support member is movable relative to the frame, (iii) a cab assembly supported by the support member, and (iv) an actuation mechanism mechanically coupled to the frame and the support member, the actuation mechanism being operable between a retract mode of operation and an extend mode of operation. The method includes the step of placing the actuation mechanism in the extend mode of operation so as to cause the support member and the cab assembly to move relative to the frame such that the support member and the cab assembly advance a distance $D_1$ along an axis of the frame in a first direction. The method also includes the step of placing the actuation mechanism in the retract mode of operation so as to cause the support member and the cab assembly to move relative to the frame such that the support member and the cab assembly advance a distance $D_2$ along an axis of the frame in a second direction.

BEST MODE FOR CARRYING OUT THE INVENTION

Figure 1:
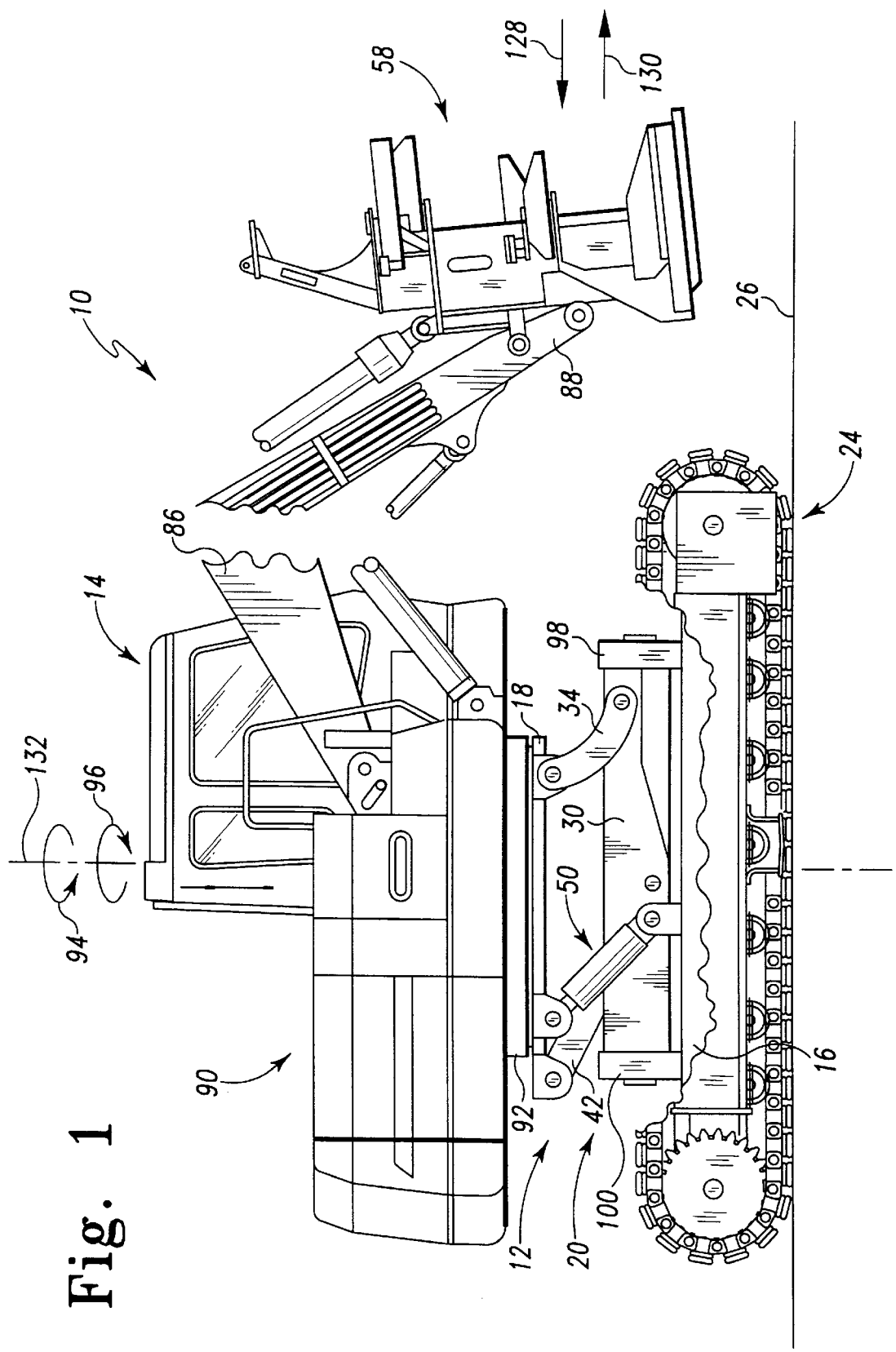
FIG. 1 is a fragmentary side elevational view of a exemplary work machine which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a work machine 10 which incorporates the features of the present invention therein. Work machine 10 includes a frame 16, an undercarriage 24, and a tilt mechanism 12. Undercarriage 24 and tilt mechanism 12 are both mechanically coupled to frame 16. Work machine 10 also includes a body assembly 90, a cab assembly 14, and a swing bearing 92. Body assembly 90 and cab assembly 14 both rest on swing bearing 92, and swing bearing 92 is supported by tilt mechanism 12. Work machine 10 further includes a boom 86 and a stick 88 both of which are mechanically coupled to body assembly 90. In addition, work machine 10 includes a work implement 58 (i) attached to stick 88 and (ii) mechanically coupled to frame 16 via tilt mechanism 12, swing bearing 92, body assembly 90, boom 86, and stick 88.

Undercarriage 24 functions to move work machine 10 over a ground segment 26. In particular, actuation of undercarriage 24 results in the movement of work machine 10 over ground segment 26 in the directions indicated by arrows 128 and 130. Swing bearing 92 is interposed between body assembly 90 and tilt mechanism 12. Swing bearing 92 functions to allow the rotation of body assembly 90 and cab assembly 14 around an axis of rotation 132 in the directions indicated by arrows 94 and 96. Work implement 58 is utilized in the performance of various work functions. For example, work implement 58 may be utilized to cut down trees.

Figure 2:
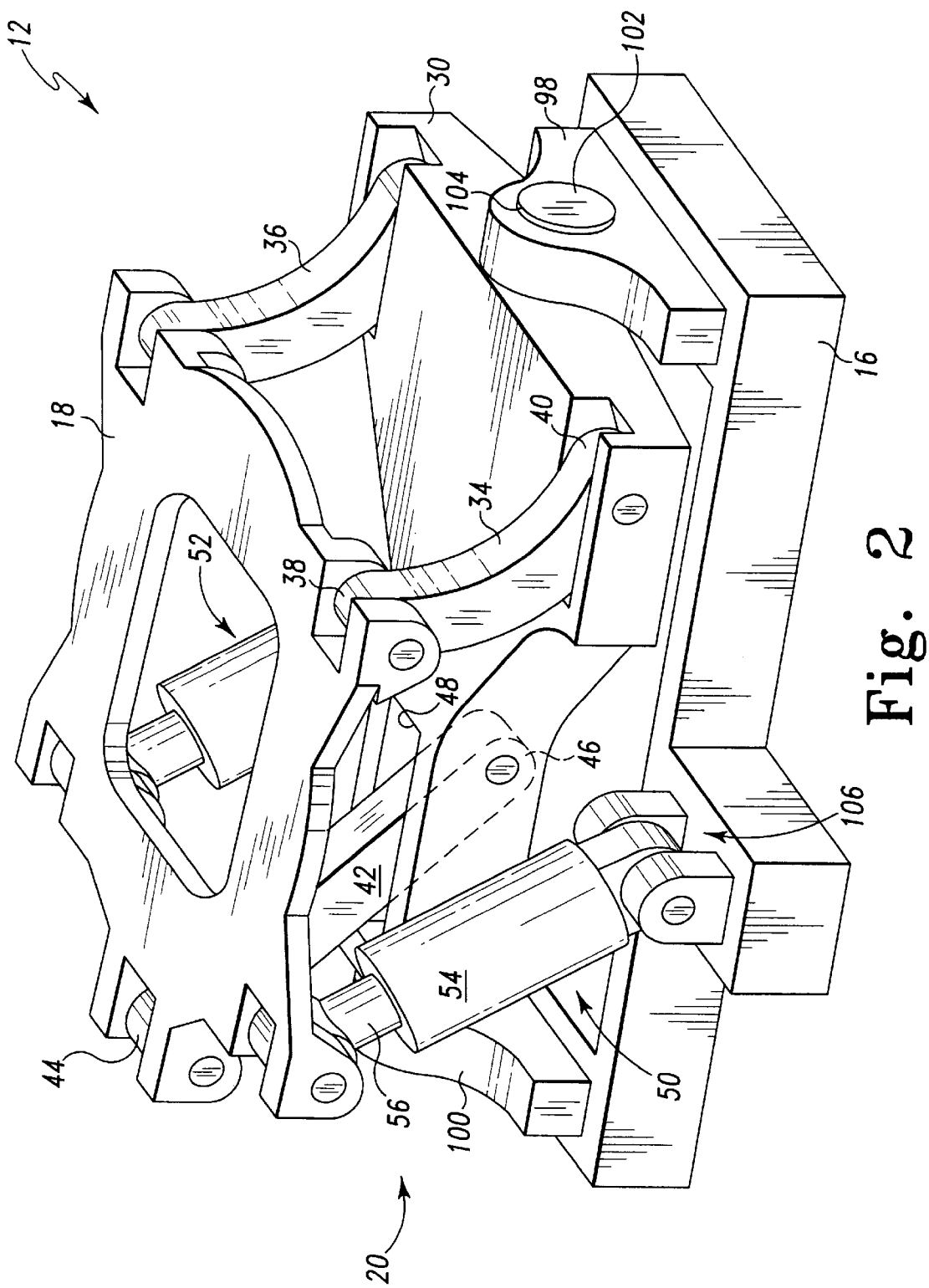
FIG. 2 is a perspective view of the tilt mechanism of the work machine of FIG. 1.

Referring now to FIGS. 1 and 2, tilt mechanism 12 is interposed between cab assembly 14 and frame 16 and includes a support member 18, a pivot member 30, and an actuation mechanism 20. Tilt mechanism 12 also includes a pair of swing arms 34 and 36. Tilt mechanism 12 further includes an idler arm 42 and a pair of pivot brackets 98 and 100.

Pivot member 30 has a pair of neck portions 102 extending therefrom. Each neck portion 102 extends from an opposite end of pivot member 30. Pivot member 30 is mounted on frame 16 with pivot brackets 98 and 100. In particular, each pivot bracket 98 and 100 is secured (e.g. welded) to frame 16. In addition, each pivot bracket 98 and 100 has an aperture 104 defined therein. Note that only the aperture 104 and one neck portion 102 is shown in FIG. 2. Pivot member 30 is positioned relative to pivot brackets 98 and 100 so that one neck portion 102 extends into each aperture 104, thereby securing pivot member 30 to frame 16.

Support member 18 is then secured to pivot member 30 via swing arm 34, swing arm 36, and idler arm 42. Specifically, a first end 38 and a second end 40 of swing arm 34 are respectively pinned to a side portion of support member 18 and pivot member 30. Swing arm 36 is secured to support member 18 and pivot member 30 in an identical manner as described for swing arm 34, but on the opposite side portion of support member 18 and pivot member 30 as clearly shown in FIG. 2. A third end 44 of idler arm 42 is positioned relative to support member 18 such that third end 44 is located adjacent to the center of a rear edge of support member 18. Third end 44 of idler arm 42 is then pinned support member 18 so that third end 44 is located behind both swing arms 34 and 36. A fourth end 46 of idler arm 42 is located relative to pivot member 30 so that fourth end 46 extends into a passageway 48 defined in pivot member 30. The fourth end 44 of idler arm 42 is then pinned to pivot member 30.

Actuation mechanism 20 of tilt mechanism 12 includes a pair of hydraulic cylinders 50 and 52. Hydraulic cylinder 50 includes a housing 54 and a rod 56. Rod 56 is positionable relative to housing 54 between an inward position in which rod 56 is retracted into housing 54 and an outward position in which rod 56 extends outwardly from housing 54. Hydraulic cylinder 50 is positioned relative to frame 16 so that an end of housing 54 extends into a bracket 106 secured to frame 16. Housing 54 is then pinned to frame 16 with a spherical bearing. An end of rod 56 is then positioned adjacent to the rear edge of support member 18 so that the end of rod 56 is located behind first end 38 of swing arm 34. The end of rod 56 is then pinned to support member 18 with a spherical bearing. Hydraulic cylinder 52 is secured to frame 16 and support member 18 in an identical manner as described for hydraulic cylinder 50 but on the opposite side of support member 18 and frame 16.

It should be understood that both hydraulic cylinders 50 and 52 are part of a conventional hydraulic fluid circuit which includes an operational pressure source to urge rod 56 and the rod of hydraulic cylinder 52 in and out of their respective housings. As such, a more detailed description of the hydraulic circuit which includes hydraulic cylinders 50 and 52 will not be provided.

Securing swing arms 34 and 36, hydraulic cylinders 50 and 52, and idler arm 42 in the above described manner locates hydraulic cylinders 50 and 52 and idler arm 42 behind swing arms 34 and 36. In addition, securing these elements in the above described manner interposes idler arm 42 between hydraulic cylinders 50 and 52.

Figure 3:
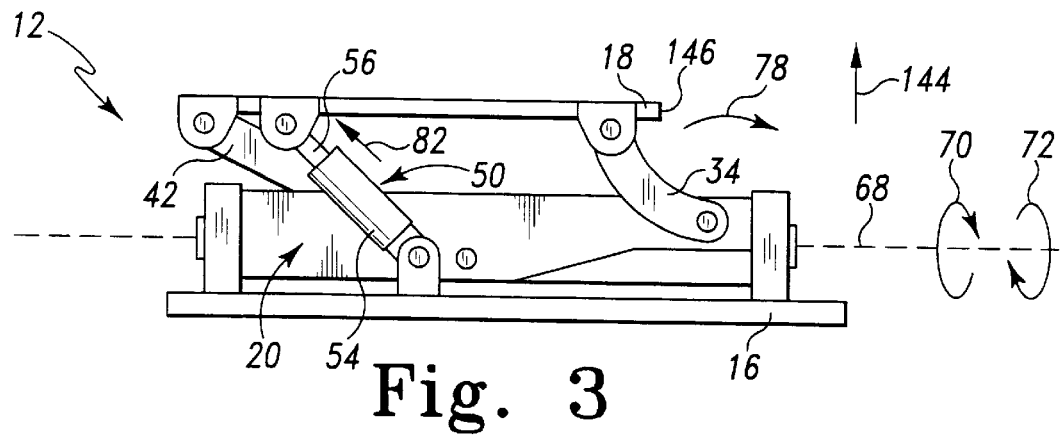
FIG. 3 is a side elevational view of the tilt mechanism of FIG. 2 with the support member thereof shown located in the retract position.

Actuation mechanism 20 is operable between a retract mode of operation and an extend mode of operation. In addition, actuation mechanism 20 is operable between a first pivot mode of operation and a second pivot mode of operation. When actuation mechanism 20 is in the retract mode of operation, support member 18 is positioned relative to pivot member 30 and frame 16 as shown in FIG. 3 (i.e. the retract position). It should be appreciated that when located in the retract mode, support member 18 is tilted or angled relative to frame 16 so that a forward edge 146 of support member 18 is moved in the direction indicated by arrow 144 (see FIG. 3). When support member 18 is located in the retract position as shown in FIG. 3, and actuation mechanism 20 is removed from the retract mode of operation and placed in the extend mode of operation, swing arms 34 and 36 and idler arm 42 are moved or pivoted relative to pivot member 30 in the direction indicated by arrow 78. In particular, when actuation mechanism 20 is removed from the retract mode of operation and placed in the extend mode of operation, rod 56 of hydraulic cylinder 50 is urged out of housing 54 in the direction indicated by arrow 82. Urging rod 56 in the above described manner results in rod 56 being removed from the inward position (see FIG. 3) and placed in the outward position (see FIG. 5). Moving rod 56 from the inward position to the outward position causes swing arms 34 and 36 and idler arm 42 to be pivoted in the direction indicated by arrow 78.

It should be understood that hydraulic cylinder 52 functions in an identical manner as that described above for hydraulic cylinder 50 when actuation mechanism 20 is placed in the extend mode of operation. Therefore, a specific discussion of the operation of hydraulic cylinder 52 when actuation mechanism 20 is placed in the extend mode of operation will not be provided.

Figure 4:
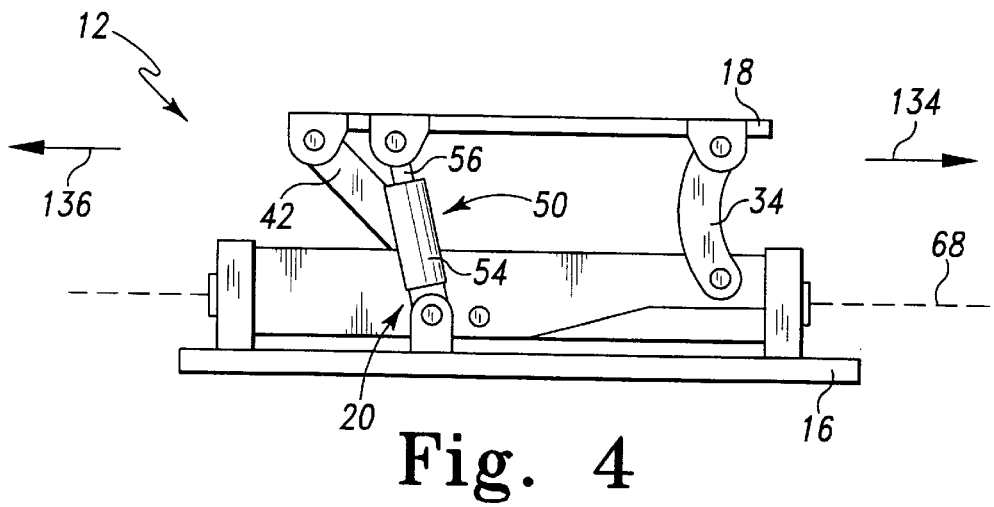
FIG. 4 is a view similar to the one shown in FIG. 3, but showing the support member located in a position intermediate the retract position and the extend position.
Figure 5:
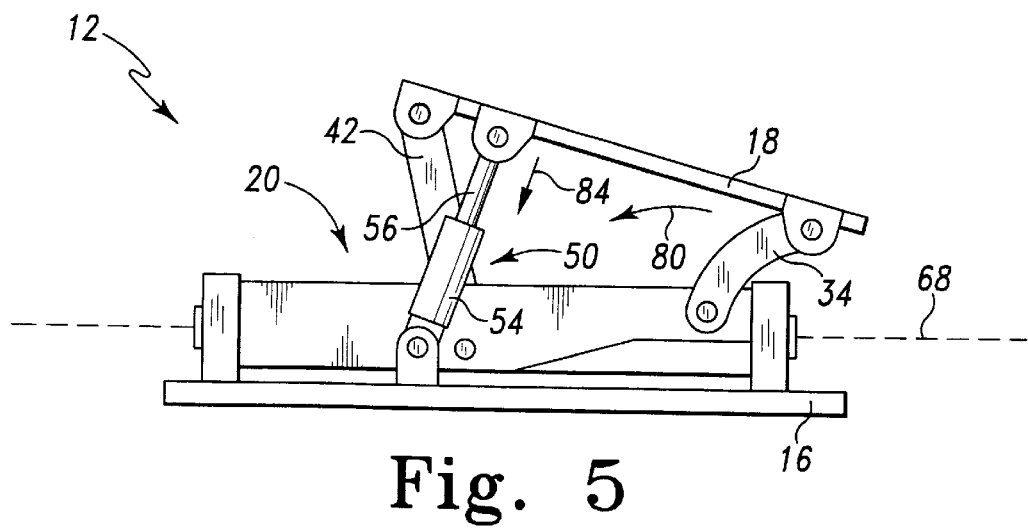
FIG. 5 is a view similar to the one shown in FIG. 3, but showing the support member located in the extend position.
Figure 9:
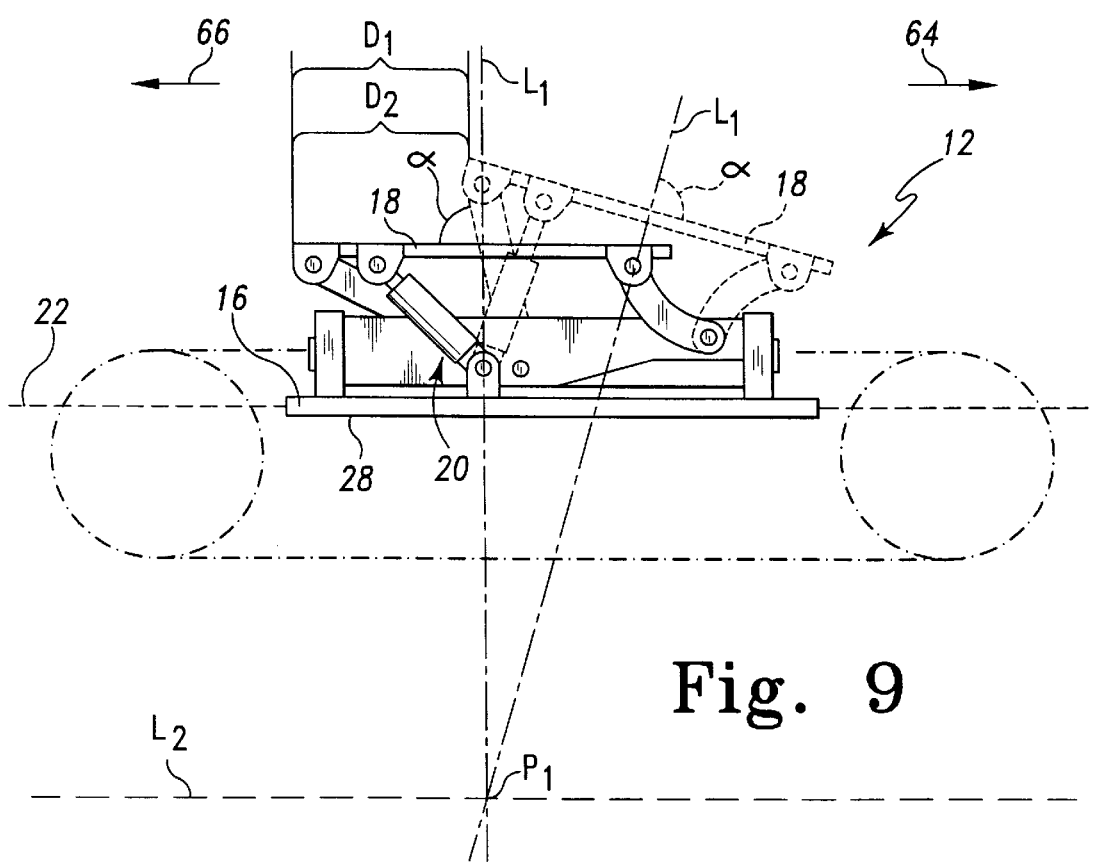
FIG. 9 is a schematic representation of the work machine of FIG. 1 showing the support member located in the retract position and the extend position (note that the extend position is shown in phantom for clarity of description).

Pivoting swing arms 34 and 36 and idler arm 42 in the direction indicated by arrow 78 results in support member 18 being moved relative to frame 16 in the direction indicated by arrow 134, as shown in FIG. 4. Further pivoting swing arms 34 and 36 and idler arm 42 in the above described manner results in support member 18 being located in an extend position, as shown in FIG. 5. It should be understood that moving support member 18 from the retract position to the extend position causes support member 18 to be advanced along an axis 22 of frame 16 in a direction indicated by arrow 64 as shown in FIG. 9. In particular, support member 18 is advanced a distance $D_1$ along axis 22 when moved to the extend position. Furthermore, note that when support member 18 is located in the extend position, support member 18 is tilted or angled relative to frame 16.

It should be appreciated that moving support member 18 relative to frame 16 in the above described manner has several advantages over other tilt mechanisms which simply pivot or rotate a support member relative to a frame. For example, as shown in FIG. 9, support member 18 has a center line $L_1$ which passes through support member 18 so as to define a substantially 90° angle α between support member 18 and center line $L_1$. In addition, a line $L_2$ is defined by a line which is (a) positioned below frame 16 and (b) in a substantially parallel relationship with a lower edge 28 of frame 16. When support member 18 is located in the retract position center line $L_1$ intersects line $L_2$ at a point $P_1$. Moreover, moving and tilting support member 18 relative to frame 16 when support member 18 is moved from the retract position to the extend position in the above described manner results in center line $L_1$ intersecting line $L_2$ at substantially the same point $P_1$. In other words, when support member 18 is located in the extend position center line $L_1$ also intersects line $L_2$ at point $P_1$. Having a tilt mechanism design that moves support member 18 relative to frame 16 rather than just pivoting the support member relative to the frame enhances the stability of work machine 10 when support member 18 is located in the extend position. Moreover, having a tilt mechanism design that results in center line $L_1$ intersecting line $L_2$ at $P_1$ regardless of whether support member 18 is located in the retract position or the extend position also enhances the stability of work machine 10 when support member 18 is located in the extend position. Therefore, work machine 10 is less likely to tip over when being operated on uneven terrain with support member 18 located in the extend position.

Figure 8:
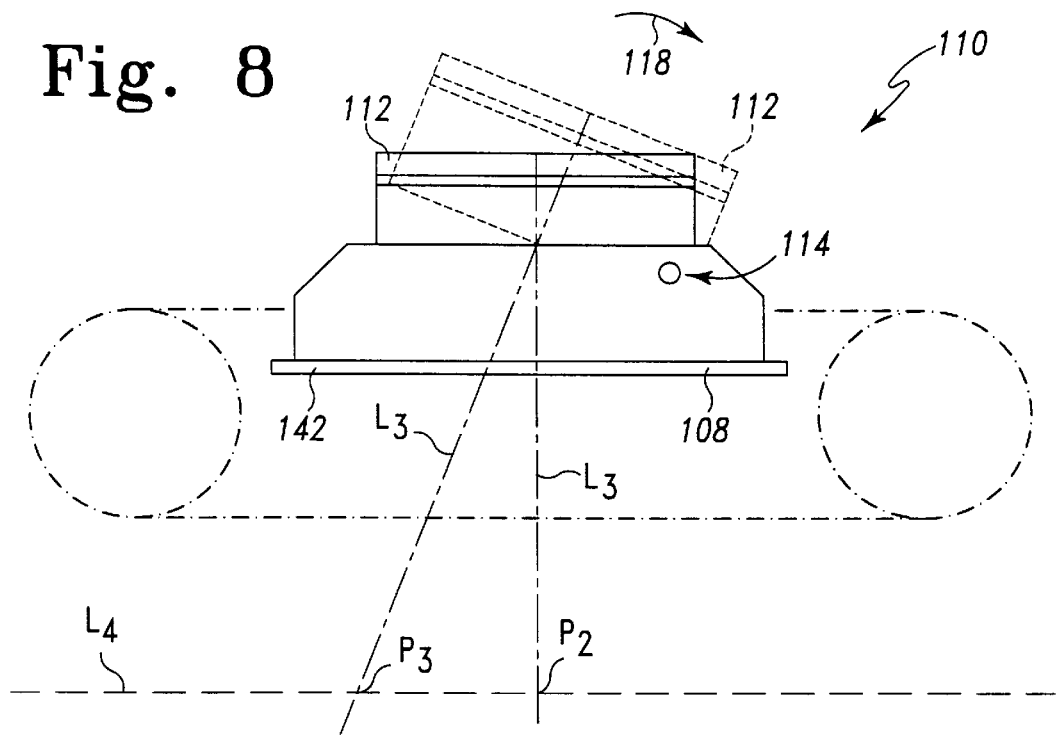
FIG. 8 is schematic representation of a prior art work machine showing the tilt mechanism thereof positioned in two pivot positions (note that one position is shown in phantom for clarity of description)

The above discussed enhanced stability is in contrast to other tilt mechanisms. In particular, as previously mentioned, some tilt mechanism designs simply pivot or rotate the support member relative to the frame to level the cab assembly as opposed to actually advancing or moving the support member along an axis of the frame. For example, FIG. 8 shows a tilt mechanism 110 which includes a support member 112 and a frame 108. Support member 112 also has a center line $L_3$ like support member 18. In addition, a line $L_4$ is defined by a line which is (a) positioned below frame 108 and (b) in a substantially parallel relationship with a lower edge 142 of frame 108.

Support member 112 is secured to frame 108 at a pivot point 114. Having support member 112 pivotally secured to frame 108 in the above described manner only allows support member 112 to rotate or pivot relative to frame 108 around a fixed point, i.e. pivot point 114. The entire support member 112 can not be advanced along an axis of frame 108 as is the case for support member 18. As a result, center line $L_3$ of support member 112 intersects line $L_4$ at different points depending upon whether support member 112 is tilted forward or positioned in a parallel relationship with frame 108. For example, when support member 112 is located in a substantially parallel relationship with frame 108, center line $L_3$ intersects line $L_4$ at point $P_2$. However, when support member 112 is rotated relative to frame 108 in the direction indicated by arrow 118, center line $L_3$ intersects line $L_4$ at a point $P_3$. Having a tilting mechanism configuration that causes center line $L_3$ to intersect line $L_4$ at different points depending upon whether support member 112 is rotated in the direction indicated by arrow 118 results in a less stable work machine as compared to work machine 10 of the present invention.

Now referring back to FIGS. 3–5, once in the extend position (see FIG. 5), support member 18 can also be relocated back into the retract position (see FIG. 3). In particular, actuation mechanism 20 is removed from the extend mode of operation and placed in the retract mode of operation. When actuation mechanism 20 is placed in the retract mode of operation, rod 56 of hydraulic cylinder 50 is urged into housing 54 in the direction indicated by arrow 84 (see FIG. 5). Urging rod 56 in the above described manner results in rod 56 being removed from the outward position (see FIG. 5) and placed in the inward position (see FIG. 3). Moving rod 56 from the outward position to the inward position causes swing arms 34 and 36 and idler arm 42 to be pivoted in the direction indicated by arrow 80.

It should be understood that hydraulic cylinder 52 functions in an identical manner as that described above for hydraulic cylinder 50 when actuation mechanism 20 is placed in the retract mode of operation. Therefore, a specific discussion of the operation of hydraulic cylinder 52 when actuation mechanism 20 is placed in the retract mode of operation will not be provided.

Pivoting swing arms 34 and 36 and idler arm 42 in the direction indicated by arrow 80 results in support member 18 being moved relative to frame 16 in the direction indicated by arrow 136, as shown in FIG. 4. Further pivoting swing arms 34 and 36 and idler arm 42 in the above described manner results in support member 18 being located in the retract position, as shown in FIG. 3.

Figure 6:
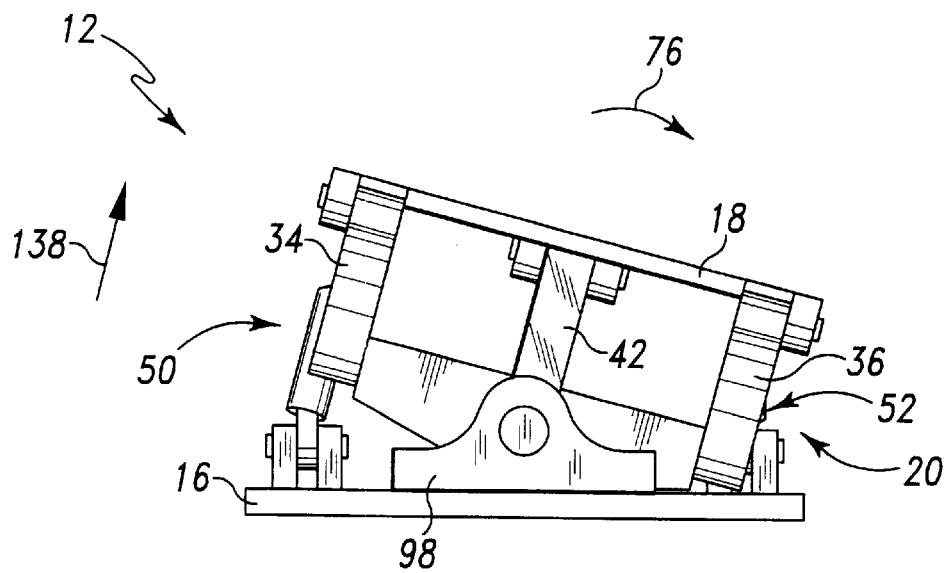
FIG. 6 is a front elevational view of the tilt mechanism of FIG. 2 showing the support member thereof rotated around a pivot axis in a first direction.
Figure 7:
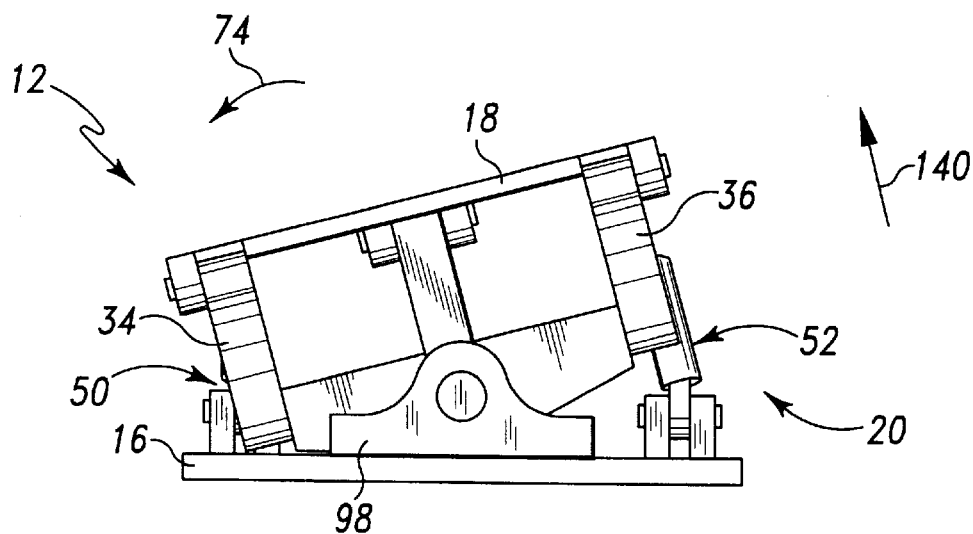
FIG. 7 is a view similar to FIG. 6, but showing the support member rotated around the pivot axis in a second direction.

Referring now to FIGS. 6 and 7, placing actuation mechanism 20 in the first pivot mode of operation causes rod 56 of hydraulic cylinder 50 to be urged out of housing 54 in the direction indicated by arrow 138. Urging rod 56 in the above described manner results in rod 56 being removed from the inward position and placed in the outward position. As rod 56 of hydraulic cylinder 50 is being moved into the outward position, the rod of hydraulic cylinder 52 is urged into its corresponding housing. Moving rod 56 from the inward position to the outward position while simultaneously moving the rod of hydraulic cylinder 52 into its corresponding housing causes pivot member 30 and support member 18 to rotate around a pivot axis 68 (see FIGS. 3–5) in the direction indicated by arrow 70 as shown in FIG. 3. Rotating pivot member 30 and support member 18 in the above described manner results in pivot member 30 and support member 18 being pivoted or angled relative to frame 16 in the direction indicated by arrow 76 as shown in FIG. 6.

Placing actuation mechanism 20 in the second pivot mode of operation causes the rod of hydraulic cylinder 52 to be urged out of its housing in the direction indicated by arrow 140 (see FIG. 7). Urging the rod of hydraulic cylinder 52 in the above described manner results in the rod being removed from the inward position and placed in the outward position. As the rod of hydraulic cylinder 52 is being moved into the outward position, rod 56 of hydraulic cylinder 50 is urged into its corresponding housing (i.e. housing 54). Moving the rod of hydraulic cylinder 52 from the inward position to the outward position while simultaneously moving rod 56 of hydraulic cylinder 50 into its corresponding housing (i.e. housing 54) causes pivot member 30 and support member 18 to rotate around a pivot axis 68 (see FIGS. 3–5) in the direction indicated by arrow 72 as shown in FIG. 3. Rotating pivot member 30 and support member 18 in the above described manner results in pivot member 30 and support member 18 being pivoted or angled relative to frame 16 in the direction indicated by arrow 74 as shown in FIG. 7.

Support member 18 and pivot member 30 can be returned to a position in which support member 18 and pivot member 30 are in a substantially parallel relationship with frame 16, as shown in FIG. 2, by placing actuation mechanism 20 in a rest mode of operation. When actuation mechanism 20 is placed in the rest mode of operation, rod 56 of hydraulic cylinder 50 and the rod of hydraulic cylinder 52 are positioned such that they both extend out of their respective housings at a substantially equal distance. For example, if pivot member 30 and support member 18 are initially positioned relative to frame 16 as shown in FIG. 6, and actuation mechanism 20 is placed in the rest mode of operation, then rod 56 of hydraulic cylinder 50 will be advanced into housing 54 and the rod of hydraulic cylinder 52 will be advanced out of its corresponding housing so that each rod extends out its respective housing a substantially equal distance. Having rod 56 of hydraulic cylinder 50 and the rod of hydraulic cylinder 52 both extending out of their respective housings at a substantially equal distance results in support member 18 and pivot member 30 being place in a substantially parallel relationship with frame 16 as shown in FIG. 2.

Industrial Applicability

During use of work machine 10 an operator thereof (not shown) can position support member 18 in the retract position, the extend position, or any position therebetween. In addition, the operator can rotate support member 18 relative to frame 16 as shown in FIGS. 6 and 7, or to any rotated position between the ones shown in FIGS. 6 and 7. Which position the operator locates support member 18, and therefore cab assembly 14, depends upon the topography of the terrain on which work machine 10 is positioned. For example, if work machine 10 is positioned on an incline so that cab assembly 14 faces the incline while performing a work function, the operator of work machine 10 will place support member 18 in the extend position in the above described manner. Placing support member 18 in the extend position while work machine 10 is located on the aforementioned incline results in the cab assembly 14 being located in a substantial level orientation relative to the horizon. Having cab assembly 14 located in a substantial level orientation relative to the horizon ensures that the operator is comfortable during the performance of the work function. Ensuring the comfort of the operator facilitates the efficient functioning of work machine 10. In addition, support member 18 can be located in any of the other previously mentioned positions (e.g. the retract position, or rotated around pivot axis 68 in the directions indicated by arrows 70 and 72) to locate cab assembly 14 in a substantially level orientation relative to the horizon.

It should also be appreciated that support member 18 can be located in any of the previously discussed positions so that the capability of work machine 10 to maneuver in close quarters is enhanced, e.g. maneuvering between rows of trees which are positioned close together.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A tilt mechanism for supporting a cab assembly, comprising:
    a frame;
    a support member for supporting said cab assembly, said support member being mechanically coupled to said frame so that said support member is movable relative to said frame; and
    an actuation mechanism mechanically coupled to said frame and said support member, said actuation mechanism being operable between a retract mode of operation and an extend mode of operation,
    wherein (i) placing said actuation mechanism in said extend mode of operation causes said support member to move relative to said frame such that said support member advances a distance $D_1$ along an axis of said frame in a first direction and (ii) placing said actuation mechanism in said retract mode of operation causes said support member to move relative to said frame such that said support member advances a distance $D_2$ along said axis of said frame in a second direction.

2. The tilt mechanism of claim 1, wherein:
    said support member is located in an extend position when said actuation mechanism is in said extend mode of operation,
    said support member is located in a retract position when said actuation mechanism is in said retract mode of operation,
    said support member has a center line $L_1$ which passes through said support member so as to define a substantially 90° angle $\alpha$ between said support member and said center line $L_1$,
    a line $L_2$ is defined by a line which is (a) positioned below said frame and (b) in a substantially parallel relationship with a lower edge of said frame,
    said center line $L_1$ intersects said line $L_2$ at a point $P_1$ when said support member is located in said retract position, and said center line $L_1$ also intersects said line $L_2$ at said point $P_1$ when said support member is located in said extend position.

3. The tilt mechanism of claim 1, further comprising:

a pivot member in terposed between said support member and said frame, wherein said pivot member is (i) mechanically coupled to said support member and (ii) pivotally mounted on said frame so that said pivot member and said support member can rotate relative to said frame around a pivot axis.

4. The tilt mechanism of claim 3, further comprising:

a swing arm having a first end and a second end, wherein (i) said first end is attached to said support member, (ii) said second end is attached to said pivot member, and (iii) said swing arm pivots relative to said support member and said pivot member when said support member is advanced along said axis of said frame in said first direction or said second direction.

5. The tilt mechanism of claim 3, further comprising:

an idler arm having a third end and a forth end, wherein (i) said third end is attached to said support member, (ii) said pivot member has a passageway defined therethrough, (iii) said forth end is attached to said pivot member so that said forth end of said idler arm extends into said passageway, and (iv) said idler arm pivots relative to said support member and said pivot member when said support member is advanced along said axis of said frame in said first direction or said second direction.

6. The tilt mechanism of claim 3, wherein:

said actuation mechanism is further operable between a first pivot mode of operation and a second pivot mode of operation, placing said actuation mechanism in said first pivot mode of operation causes said pivot member and said support member to rotate around said pivot axis in a first pivot direction, and placing said actuation mechanism in said second pivot mode of operation causes said pivot member and said support member to rotate around said pivot axis in a second pivot direction.

7. The tilt mechanism of claim 1, wherein:

said actuation mechanism includes a hydraulic cylinder having (i) a housing and (ii) a rod positioned within said housing, said rod is positionable relative to said housing between an inward position and an outward position, moving said rod from said inward position to said outward position causes said support member to move relative to said frame such that said support member is advanced along said axis of said frame in said first direction, and moving said rod from said outward position to said inward position causes said support member to move relative to said frame such that said support member is advanced along said axis of said frame in said second direction.

8. The tilt mechanism of claim 1, further comprising:

an undercarriage for advancing said cab assembly over a ground segment, said undercarriage being mechanically coupled to said frame.

9. A work machine, comprising:

a frame;

a work implement mechanically coupled to said frame;

a support member mechanically coupled to said frame so that said support member is movable relative to said frame between a retract position and an extend position;

a cab assembly supported by said support member; and an actuation mechanism mechanically coupled to said frame and said support member, said actuation mechanism being operable between a retract mode of operation and an extend mode of operation, wherein (i) placing said actuation mechanism in said extend mode of operation causes said support member to move relative to said frame such that said support member advances a distance $D_1$ along an axis of said frame in a first direction, (ii) placing said actuation mechanism in said retract mode of operation causes said support member to move relative to said frame such that said support member advances a distance $D_2$ along said axis of said frame in a second direction, (iii) said support member has a center line $L_1$ which passes through said support member so as to define a substantially 90° angle $\alpha$ between said support member and said center line $L_1$, (iv) a line $L_2$ is defined by a line which is (a) positioned below said frame and (b) in a substantially parallel relationship with a lower edge of said frame, (v) said center line $L_1$ intersects said line $L_2$ at a point $P_1$ when said support member is located in said retract position, and (vi) said center line $L_1$ also intersects said line $L_2$ at said point $P_1$ when said support member is located in said extend position.

10. The work machine of claim 9, further comprising:

a pivot member interposed between said support member and said frame, wherein said pivot member is (i) mechanically coupled to said support member and (ii) pivotally mounted on said frame so that said pivot member and said support member can rotate relative to said frame around a pivot axis.

11. The work machine of claim 10, further comprising:

a swing arm having a first end and a second end, wherein (i) said first end is attached to said support member, (ii) said second end is attached to said pivot member, and (iii) said swing arm pivots relative to said support member and said pivot member when said support member is advanced along said axis of said frame in said first direction or said second direction.

12. The work machine of claim 10, further comprising:

an idler arm having a third end and a forth end, wherein (i) said third end is attached to said support member, (ii) said pivot member has a passageway defined therethrough, (iii) said forth end is attached to said pivot member so that said forth end of said idler arm extends into said passageway, and (iv) said idler arm pivots relative to said support member and said pivot member when said support member is advanced along said axis of said frame in said first direction or said second direction.

13. The work machine of claim 10, wherein:

said actuation mechanism is further operable between a first pivot mode of operation and a second pivot mode of operation, placing said actuation mechanism in said first pivot mode of operation causes said pivot member and said support member to rotate around said pivot axis in a first pivot direction, and placing said actuation mechanism in said second pivot mode of operation causes said pivot member and said support member to rotate around said pivot axis in a second pivot direction.

14. The work machine of claim 9, wherein:

said actuation mechanism includes a hydraulic cylinder having (i) a housing and (ii) a rod positioned within said housing, said rod is positionable relative to said housing between an inward position and an outward position, moving said rod from said inward position to said outward position causes said support member to move relative to said frame such that said support member is advanced along said axis of said frame in said first direction, and moving said rod from said outward position to said inward position causes said support member to move relative to said frame such that said support member is advanced along said axis of said frame in said second direction.

15. A method of operating a tilt mechanism of a work machine having (i) a frame, (ii) a support member mechanically coupled to said frame so that said support member is movable relative to said frame, (iii) a cab assembly supported by said support member, and (iv) an actuation mechanism mechanically coupled to said frame and said support member, said actuation mechanism being operable between a retract mode of operation and an extend mode of operation, comprising the steps of:

placing said actuation mechanism in said extend mode of operation so as to cause said support member and said cab assembly to move relative to said frame such that said support member and said cab assembly advance a distance $D_1$ along an axis of said frame in a first direction; and placing said actuation mechanism in said retract mode of operation so as to cause said support member and said cab assembly to move relative to said frame such that said support member and said cab assembly advance a distance $D_2$ along an axis of said frame in a second direction.

16. The method of claim 15, wherein (i) said work machine includes a pivot member interposed between said support member and said frame, (ii) said pivot member is mechanically coupled to said support member, (iii) said pivot member is pivotally mounted on said frame so that said pivot member and said support member can rotate relative to said frame around a pivot axis, further comprising the steps of:

positioning said actuation mechanism in a first pivot mode of operation so as to cause said pivot member and said support member to rotate around a pivot axis in a first pivot direction, and positioning said actuation mechanism in a second pivot mode of operation so as to cause said pivot member and said support member to rotate around said pivot axis in a second pivot direction.

17. The method of claim 15, wherein:

placing said actuation mechanism in said extend mode of operation causes said support member to be located in an extend position, placing said actuation mechanism in said retract mode of operation causes said support member to be located in a retract position, said support member has a center line $L_1$ which passes through said support member so as to define a substantially 90° angle $\alpha$ between said support member and said center line $L_1$, a line $L_2$ is defined by a line which is (a) positioned below said frame and (b) in a substantially parallel relationship with a lower edge of said frame, said center line $L_1$ intersects said line $L_2$ at a point $P_1$ when said support member is located in said retract position, and said center line $L_1$ also intersects said line $L_2$ at said point $P_1$ when said support member is located in said extend position.

18. The method of claim 15, wherein (i) said work machine includes a swing arm having a first end and a second end, (ii) said first end is attached to said support member, (iii) said second end is attached to said pivot member, further comprising the step of:

pivoting said swing arm relative to said support member and said pivot member when said support member is advanced along said axis of said frame in said first direction or said second direction.

19. The method of claim 16, wherein (i) said work machine includes an idler arm having a third end and a forth end, (ii) said third end is attached to said support member, (iii) said pivot member has a passageway defined therethrough, (iv) said forth end is attached to said pivot member so that said forth end of said idler arm extends into said passageway, further comprising the step of:

pivoting said idler arm relative to said support member and said pivot member when said support member is advanced along said axis of said frame in said first direction or said second direction.

20. The method of claim 15, wherein said work machine includes an undercarriage mechanically coupled to said frame, further comprising the step of:

actuating said undercarriage so as to advance said work machine over a ground segment.

* * * * *